United States Patent
Mizrahi

(10) Patent No.: US 10,348,626 B1
(45) Date of Patent: Jul. 9, 2019

(54) EFFICIENT PROCESSING OF LINKED LISTS USING DELTA ENCODING

(71) Applicant: MARVELL ISRAEL (M.I.S.L) LTD., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 320 days.

(21) Appl. No.: 14/306,825

(22) Filed: Jun. 17, 2014

Related U.S. Application Data

(60) Provisional application No. 61/911,862, filed on Dec. 4, 2013, provisional application No. 61/836,574, filed on Jun. 18, 2013.

(51) Int. Cl.
*H04L 12/741* (2013.01)
*H04L 12/18* (2006.01)

(52) U.S. Cl.
CPC ............ *H04L 45/745* (2013.01); *H04L 12/18* (2013.01)

(58) Field of Classification Search
None
See application file for complete search history.

(56) References Cited

U.S. PATENT DOCUMENTS

| | | | | |
|---|---|---|---|---|
| 6,006,018 A * | 12/1999 | Burnett | ............... | G06F 21/6236 709/200 |
| 6,618,760 B1 * | 9/2003 | Aramaki | ................. | H04L 45/00 709/238 |
| 6,968,393 B1 * | 11/2005 | Chen | ........................ | H04L 45/02 370/351 |
| 7,190,696 B1 * | 3/2007 | Manur | .................... | H04L 45/00 370/392 |
| 7,324,526 B1 * | 1/2008 | Kulkarni | ............. | H04L 12/5601 370/397 |
| 7,466,703 B1 * | 12/2008 | Arunachalam | ......... | H04L 45/00 370/351 |
| 7,773,607 B2 * | 8/2010 | Kulkarni | ............. | H04L 12/5601 370/395.21 |
| 2002/0080798 A1 * | 6/2002 | Hariguchi | ............... | H04L 45/00 370/395.31 |
| 2002/0095512 A1 * | 7/2002 | Rana | ........................ | H04L 47/10 709/232 |
| 2003/0037042 A1 * | 2/2003 | Kametani | ......... | G06F 17/30952 |
| 2003/0093555 A1 * | 5/2003 | Harding-Jones | ...... | H04L 49/254 709/238 |
| 2003/0120806 A1 * | 6/2003 | Clune | ................... | H04L 12/185 709/238 |
| 2003/0229715 A1 * | 12/2003 | Baratakke | ............... | H04L 29/06 709/245 |
| 2005/0232262 A1 * | 10/2005 | Toumura | ................. | H04L 45/00 370/389 |

(Continued)

*Primary Examiner* — Chirag G Shah
*Assistant Examiner* — Suk Jin Kang

(57) ABSTRACT

A network device configured to store a plurality of network forwarding addresses as an encoded linked list of attributes of network values and forwarding addresses. The network device is configured to encode subsequent elements of the linked list such that a packet processor of the network device, in response to a data packet, processes only a difference between the elements without processing all of the respective attributes. The network device is further configured to forward the data packet as a result of reading the encoded elements of the linked list.

10 Claims, 7 Drawing Sheets

(56) References Cited

U.S. PATENT DOCUMENTS

| | | | | |
|---|---|---|---|---|
| 2008/0107117 A1* | 5/2008 | Kulkarni | ............. | H04L 12/5601 |
| | | | | 370/395.2 |
| 2010/0082924 A1* | 4/2010 | Yasuda | ............... | G06F 11/1456 |
| | | | | 711/162 |
| 2011/0255540 A1* | 10/2011 | Mizrahi | .................. | H04L 45/00 |
| | | | | 370/392 |
| 2012/0066552 A1* | 3/2012 | Gilkerson | ........... | G06F 11/3471 |
| | | | | 714/45 |
| 2013/0024649 A1* | 1/2013 | Guo | ........................ | H04L 45/54 |
| | | | | 711/207 |
| 2013/0111127 A1* | 5/2013 | Araki | .................... | G06F 3/0605 |
| | | | | 711/114 |
| 2013/0151646 A1* | 6/2013 | Chidambaram | .... | H04L 47/6205 |
| | | | | 709/213 |
| 2013/0346725 A1* | 12/2013 | Lomet | .................... | G06F 12/10 |
| | | | | 711/206 |
| 2014/0119370 A1* | 5/2014 | Safrai | .................... | H04L 49/35 |
| | | | | 370/390 |
| 2014/0372374 A1* | 12/2014 | Bourbonnais | ..... | G06F 17/30575 |
| | | | | 707/613 |

\* cited by examiner

EFFICIENT PROCESSING OF LINKED LISTS USING DELTA ENCODING

CROSS-REFERENCE TO RELATED APPLICATION

This application claims priority to and the benefit of both U.S. Provisional Patent Application No. 61/836,574 filed Jun. 18, 2013 and U.S. Provisional Patent Application No. 61/911,862 filed Dec. 24, 2013 the disclosures of which are incorporated by reference herein in their entirety.

BACKGROUND

The present disclosure relates to a network device that processes packets.

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

As part of a data packet forwarding operation, network devices store data related to addresses for forwarding packets. The addresses are stored as attributes including information about a destination, such as a target port, a target MAC address, a priority, a VLAN, etc.

Further, a plurality of attributes corresponding to one forwarding address is stored by the network device as an element. In an example of a forwarding operation, the element is linked to one or more other elements as a linked list. Each of these other elements respectively corresponds to another forwarding address to which to forward a data packet.

SUMMARY

One or more example embodiments of the disclosure generally relate to a forwarding operation by a network device having a packet processor. The forwarding operation uses a network device which stores a plurality of elements, such as a routing table, as a linked list with each element including a plurality of attributes which correspond to respective addresses. The network device compares differences between a first element and a second element of the linked list. The network device stores an indication of the difference at the second element, and subsequently the network device is capable of determining at least part of an address by reading the difference indicator at the second element instead of reading the attributes.

DETAILED DESCRIPTION

In the following discussion, descriptions of well-known functions and constructions are omitted for increased clarity and conciseness.

Figure 1:
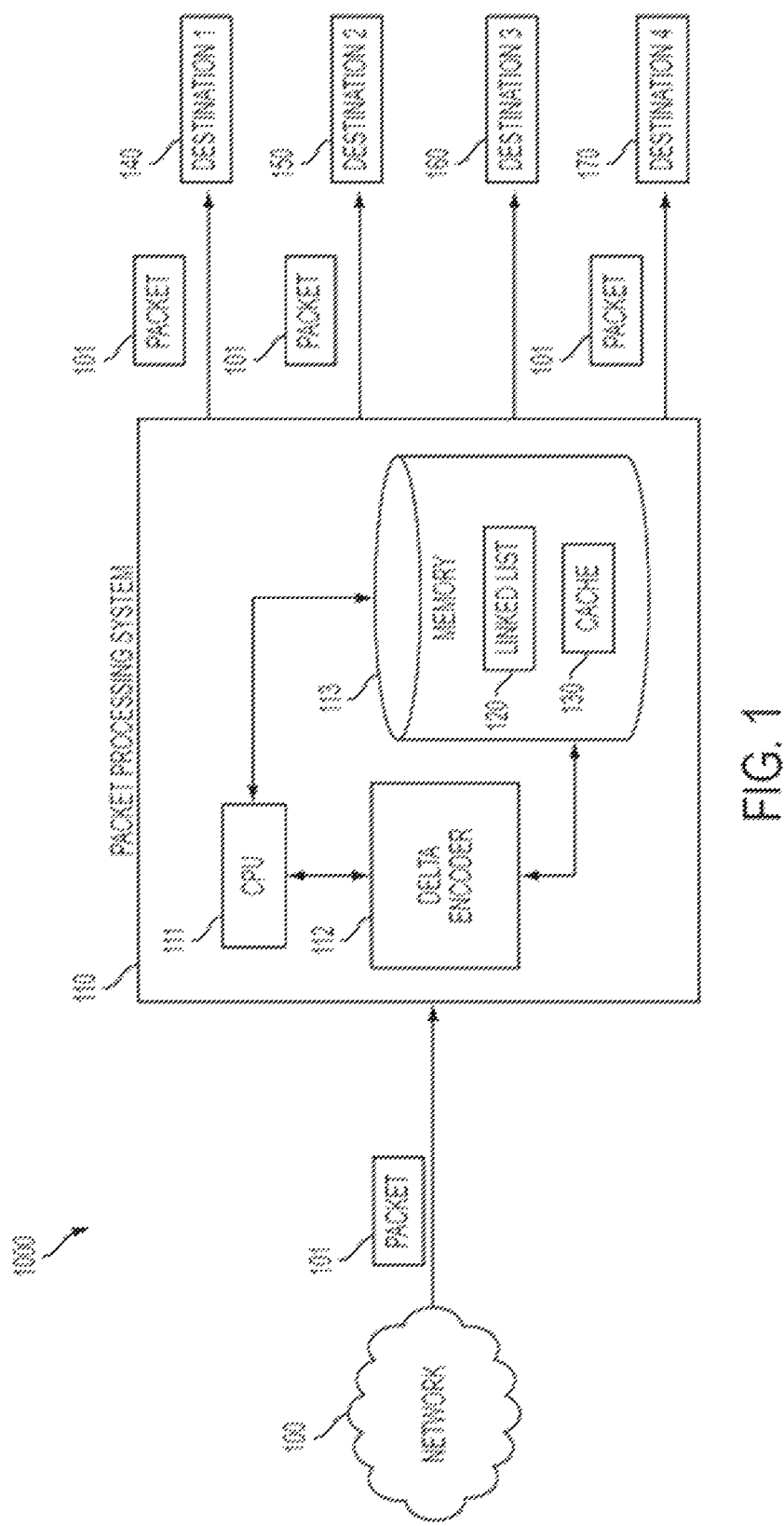
FIG. 1 shows a network device multicasting a packet from a network to one or more destinations according to example embodiments.

FIG. 1 shows a system 1000 including network 100, a packet 101, and destination 140, destination 150, destination 160, and destination 170. Each destination is a potential forwarding location to which a packet 101, received from network 100, is forwarded to by the network device 110.

The network device 110, a packet processing system, includes at least one processor core 111, as at least a packet processor (denoted "CPU"), a delta encoder 112, and a memory 113. The memory 113 includes a linked list 120 and a cache 130.

The delta encoder 112 is configured to delta encode the linked list 120 of the memory 113 which stores a plurality of forwarding address, for example addresses to each of the destinations 140-170, as elements of the linked list 120. According to an example embodiment, the packet 101 is multicast to destination 140, destination 150, and destination 170. Although FIG. 1 illustrates four potential destinations and only three recipient destinations, any number of destinations may act as recipients of a multicast or unicast operation.

According to an example embodiment, the delta encoder 112 is further configured to decode a delta encoded portion of the linked list 120 thereby decoding forwarding addresses. Delta encoding and/or decoding reduces the computational requirements of finding a network forwarding address by allowing the processing of a linked list of network attributes such that the cache 130 caches the attributes of a first element of a linked list 120 and subsequently provides corresponding elements to the CPU 111 until a delta encoded flag indicates a difference between two elements of the linked list 120. Therefore, each attribute of every element of the linked list need not be necessarily read by the packet processor in order to decode one or more forwarding addresses.

Figure 2:
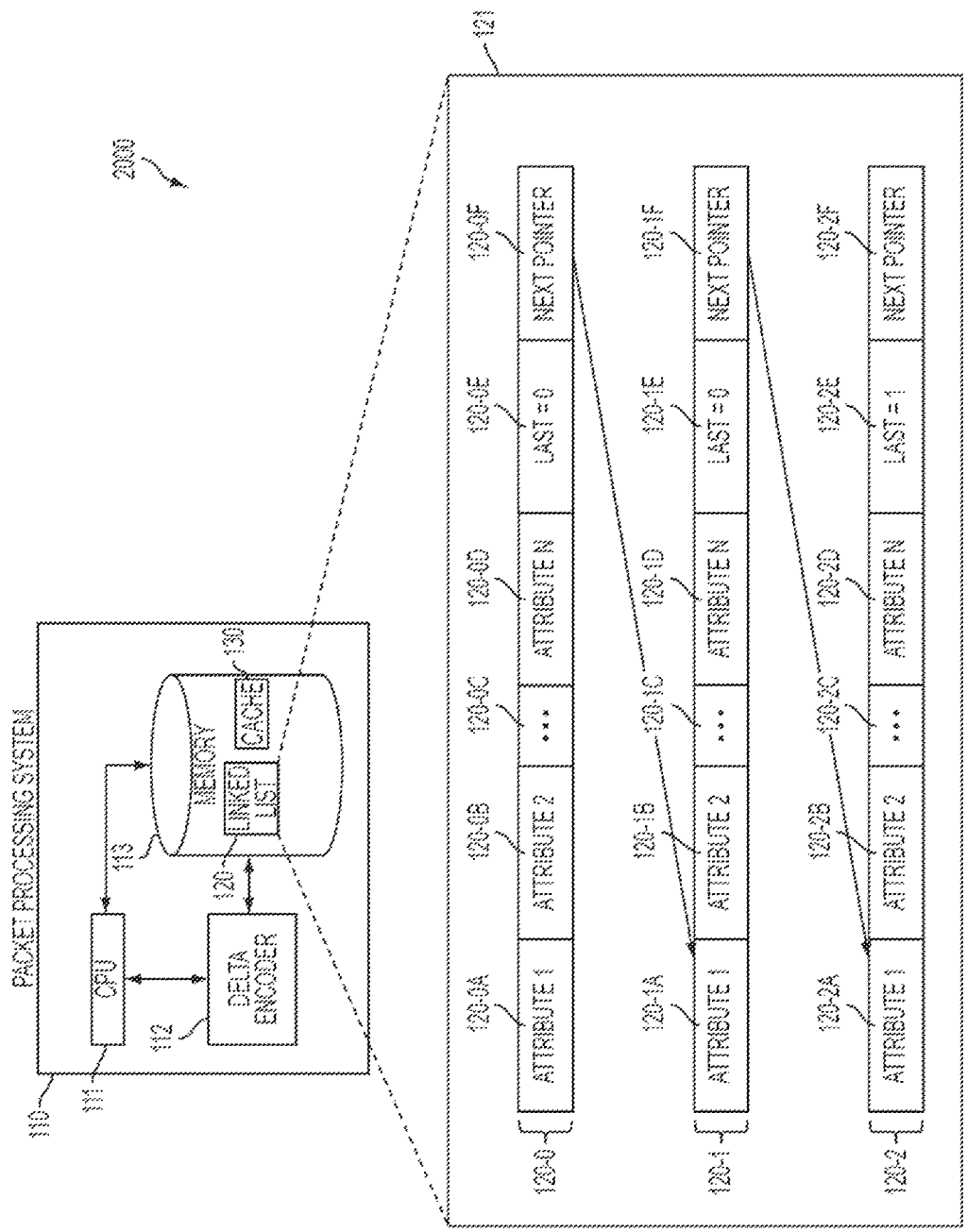
FIG. 2 shows a linked list structure corresponding to forwarding addresses stored by the network device according to example embodiments.

FIG. 2 shows a system 2000 including the network device 110 and an expanded view 121 of the linked list 120, which implements a routing table, in an example embodiment. According to the example embodiment of FIG. 2, the linked list 120, as shown, is not yet delta encoded by the delta encoder 112.

The expanded view 121 illustrates a plurality of elements of the linked list, such as element 120-0, element 120-1, and element 120-2. Each of the elements of the linked list 120 includes a plurality of attributes, a null indicator (denoted "LAST=X"; where X is 0 when there are additional attributes and X is 1 when there are no additional attributes), and a next pointer (described below).

The plurality of attributes, in this example embodiment, are attributes of a network address and relate to one or more of a forwarding address, a destination address, a target port, a target MAC address, a priority, and/or a VLAN, or the like. The null indicator is used in an example embodiment to indicate whether there is another attribute of an address to which to forward a packet during a multicast operation. The next pointer is a pointer to a subsequent element of the linked list 120.

It is noted that, by reading the attributes of the elements of the linked list 120, the packet processing system is able to make a forwarding determination for a received packet 101 and, more particularly, a determination of at least part of a destination address.

Element 120-0 includes attribute 120-0A, attribute 120-0B, attributes 120-0C, and attribute 120-0D. Element 120-0 further includes null indicator 120-0E and a next pointer 120-0F. The next pointer 120-0F points to element 120-1.

Element 120-1 includes attribute 120-1A, attribute 120-1B, attributes 120-1C, and attribute 120-1D. Element 120-1 further includes null indicator 120-1E and a next pointer 120-1F. The next pointer 120-1F points to element 120-2.

Element 120-2 includes attribute 120-2A, attribute 120-2B, attributes 120-2C, and attribute 120-2D. Element 120-2 further includes null indicator 120-2E and a next pointer 120-2F. The next pointer 120-2F points to a null node (not shown).

The network device 110 reads the elements of the linked list 120 to make forwarding determinations by retrieving from among the attributes pertinent parts of forwarding addresses and related network values involved in forwarding a packet.

Figure 3:
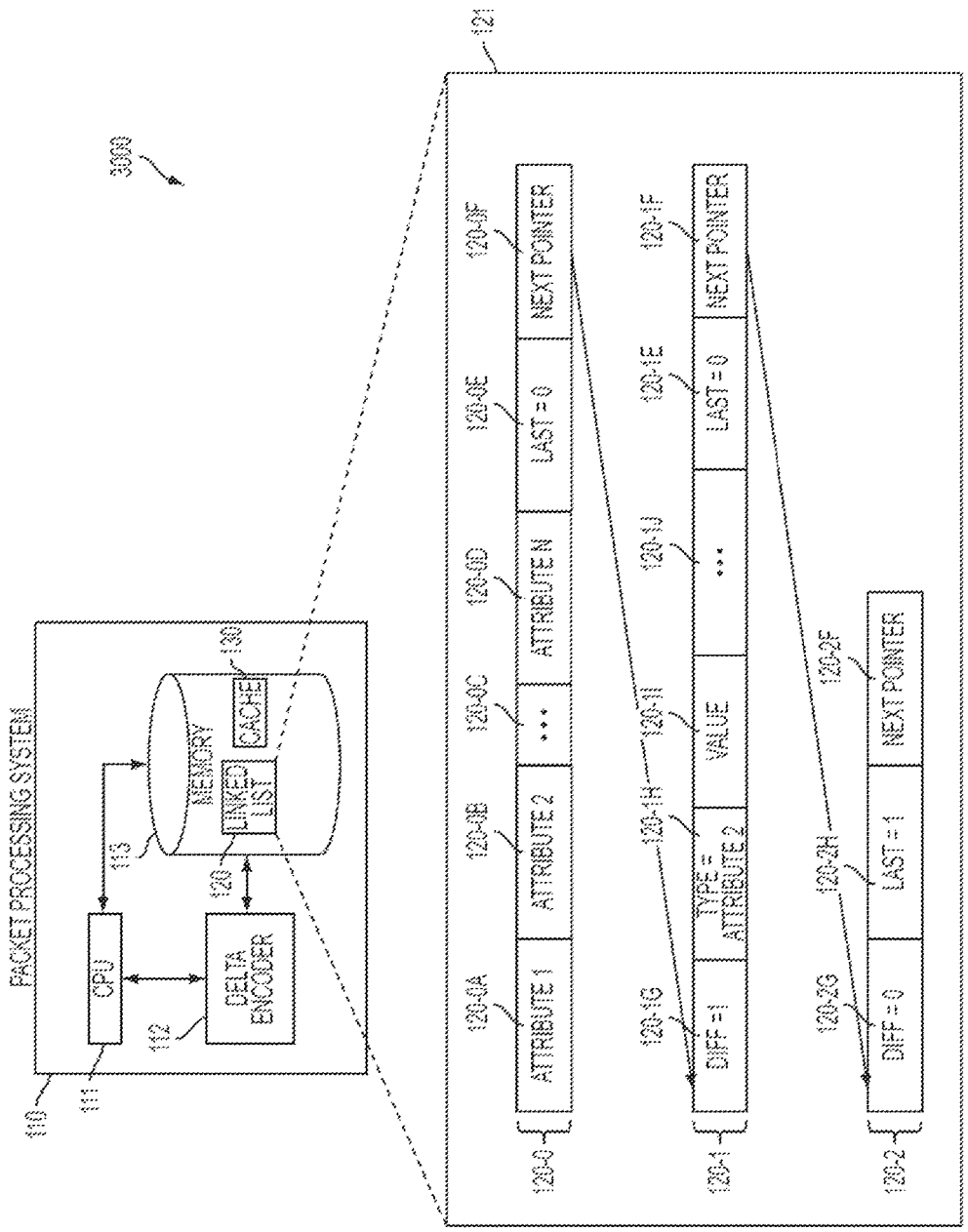
FIG. 3 shows a linked list structure resulting from a delta encoding operation according to example embodiments.

FIG. 3 shows a system 3000 including the network device 110 and an expanded view 121 of the linked list 120. In contrast to the example embodiment of FIG. 2, the linked list 120 in FIG. 3 has been delta encoded by the delta encoder 112. Although an example embodiment relating to creating such a delta encoded linked list is mentioned below, any approach to performing the delta encoding is acceptable, including delta encoding the entire list at once as well as maintaining a delta encoded list by applying suitable modifications as list elements are added or deleted.

The expanded view 121 illustrates a plurality of elements of the linked list, such as element 120-0, element 120-1, and element 120-2. Each of the elements of the linked list 120 includes an indication of a plurality of attributes, a null indicator, and a next pointer.

In addition to the plurality of attributes discussed with respect to FIG. 2, the linked list 120 of FIG. 3 additionally includes a difference indicator(s), a difference type indicator(s), and/or a difference value(s). According to an example embodiment, a difference indicator is implemented as a flag. For the sake of brevity, a difference indicator as mentioned herein may be referred to as a difference flag without regard to the particular concrete implementation.

The difference indicators each indicate whether there is a difference between any attributes of a current element and corresponding attributes of the preceding element. The corresponding attributes are attributes that occupy a corresponding position in each of the two elements. Each difference indicator indicates a difference between at least one of the attributes of a current element and an attribute at a corresponding position of the previous element. To explain further, with respect to FIG. 2, attribute 120-0B (at position "Attribute 2") of element 120-0 and attribute 120-1B of element 120-1 (also at position "Attribute 2") occupy corresponding positions.

Furthermore, it is noted that, in the linked list, element 120-0 is seen to precede element 120-1, and element 120-1 is seen to precede element 120-2. It is also noted that the next pointer of a preceding element is seen to point to a current element.

Element 120-0 of FIG. 3 includes attribute 120-0A, attribute 120-0B, attributes 120-0C, and attribute 120-0D. Element 120-0 further includes null indicator 120-0E and a next pointer 120-0F. The next pointer 120-0F points to element 120-1.

In contrast to FIG. 2, element 120-1 of FIG. 3 includes difference indicator 120-1G, difference type indicator 120-1H, difference value 120-1I, and values 120-1J. The values, according to an example embodiment, are additional difference indicators and attributes which are not delta encoded. Element 120-1 further includes null indicator 120-1E and a next pointer 120-1F. The next pointer 120-1F points to element 120-2.

In contrast to FIG. 2, element 120-2 of FIG. 3 includes difference indicator 120-2G, null indicator 120-2H and a next pointer 120-2F. The next pointer 120-2F points to a null node (not shown).

In FIG. 3, the difference indicator 120-1G has a value of "DIFF=1", according to an example embodiment, which indicates that some attribute or value in element 120-1 is different from the corresponding attribute or value in the preceding element, namely, element 120-0. In an example embodiment, a single bit is used as a flag for difference indicator 120-1G (and 120-2G, etc., as well).

The difference type indicator 120-1H in FIG. 3 has a value of "TYPE=ATTRIBUTE 2", according to an example embodiment, which indicates that attribute 2 for element 120-1 is different from the corresponding attribute 2 in the preceding element, namely, element 120-0. In general, by storing only the differences between elements, the amount of processing required for each element is reduced compared to the example embodiment shown in FIG. 2, where the complete values of all elements are stored.

In FIG. 3, attribute 120-1I reflects the value of Attribute 2 in element 120-1. According to one example embodiment, the attribute 120-1I stores the complete value of Attribute 2; according to another example embodiment, the attribute 120-1I stores an indicator of a difference in value between the two non-delta encoded Attribute 2 values (i.e., the value of attribute 2 for element 120-1 and the value of the corresponding attribute 2 in the preceding element, namely, element 120-0 as shown in FIG. 2).

In FIG. 3, element 120-2 has a difference indicator 120-2G that holds a value indicating no difference between any attribute in element 120-2 and the preceding element (namely, element 120-1).

Figures 4A, 4B:
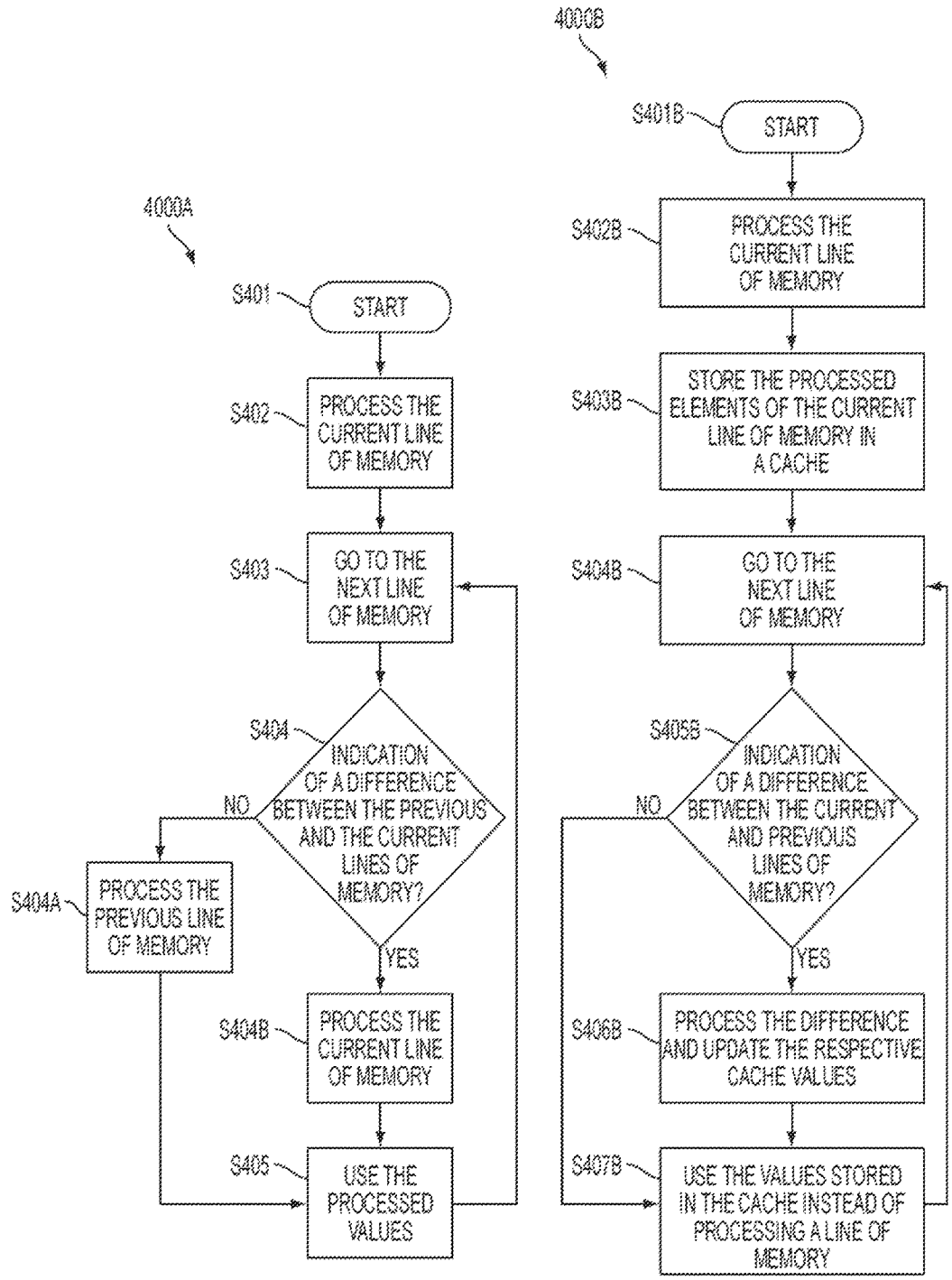
FIG. 4A shows a flowchart of a network processing operation for retrieving forwarding information from lines of memory.
FIG. 4B shows a flowchart of a network processing operation for retrieving forwarding information from delta encoded lines of memory according to example embodiments.

FIG. 4A is a flow diagram 4000A of an example algorithm and method, according to example embodiments, when a data packet is received by the network device. In other words, the example embodiment of FIG. 4A is an example of making at least a partial routing determination of at least part of a destination address responsive to a difference flag of an element of the linked list.

The example method of FIG. 4A applies to multiple example embodiments in which the network device is utilized, for example the system of FIG. 1. Processing begins at S401 at which the network device receives a data packet during a network session. The network device, using a packet processor, determines that a linked list contains a plurality of attributes corresponding to a plurality of forwarding addresses and network values for a forwarding operation. Processing continues at S402.

At S402, the packet processor processes a line of memory corresponding to a first element of the linked list, the first element containing attributes of a routing table, according to an example embodiment. The packet processor determines values, such as at least a part of a destination address, from the attributes stored at the line of the memory, and processing continues at S403.

At S403, the packet processor is pointed to a next line of memory by the previous element, the previous element stored at a previous line of memory. Processing continues at S404.

At S404, the packet processor reads the pointed-to line which also contains a set of attributes corresponding to additional values. The packet processor determines if the current element contains a difference indicated by a flag as a difference indicator or difference flag. If the difference flag of the current element indicates no difference between the current line (element) and the preceding line (element), then processing continues at S404A. If the difference flag of the current element indicates a difference, then processing continues at S404B.

At S404A, responsive to the value of the difference flag determined at S404, indicating that there is no difference between the element of the current line of memory and that of the previous line of memory, the packet processor processes the previous line of memory again to receive the same value that resulted from the processing of the previous line. Processing continues at S405. In an example embodiment, the processing is not itself repeated, but the prior result is re-used in place of carrying out such processing.

Returning to S404B, responsive to the value of the difference flag determined at S404, indicating that there is a difference between the element of the current line of memory and that of the previous line of memory, the packet processor processes the current line of memory to obtain a value different from the value determined from the previous line of memory. Since the delta encoded elements as shown in FIG. 3 are used, the processing, in an example embodiment, includes using the difference value 120-1I, for example, to determine the correct value for Attribute 2. Processing continues at S405.

It is noted that the processing of S404A and S404B, according to example embodiments, contributes to determining at least part of a destination address responsive to a value of the difference flag.

At S405, the packet processor forwards the data packet in a unicast or multicast forwarding operation to the address(es) determined, by the packet processor, as indicated by the lines of memory. Processing continues at S403.

Figure 5:
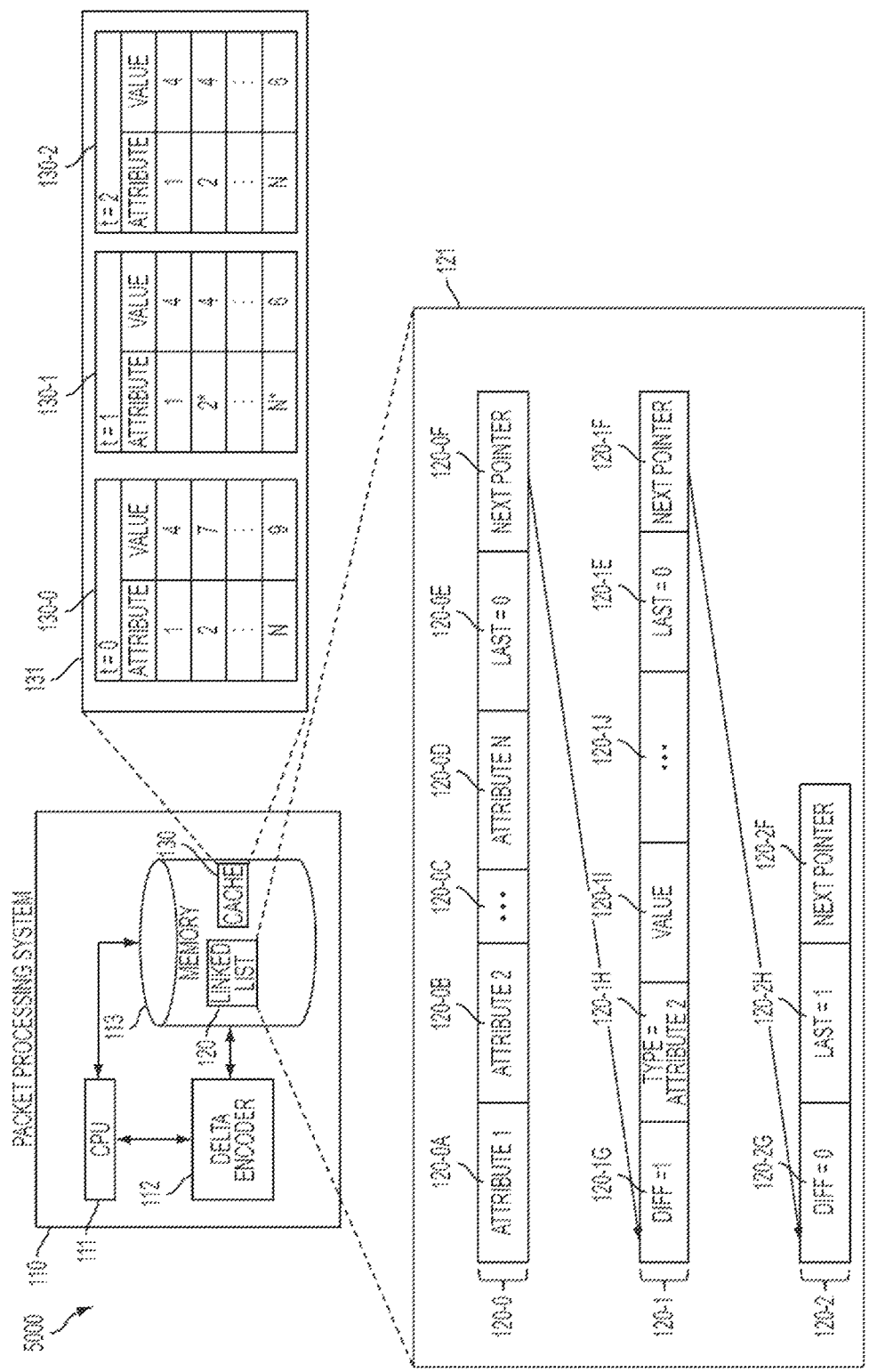
FIG. 5 shows a linked list structure with delta encoded elements and a corresponding cache operable during a network operation according to example embodiments.

FIG. 4B is a flow diagram 4000B of an example algorithm and method, according to example embodiments, when a data packet is received by the network device. In other words, the example embodiment of FIG. 4B is noted as an example of making at least a partial routing determination by determining at least part of a destination address responsive to a value indicated by a difference flag. One difference between the example embodiments of FIG. 4A and the example embodiments of FIG. 4B is that the latter includes operations related to the cache 130 as shown in FIG. 5 and described below.

The example method of FIG. 4B applies to multiple example embodiments in which the network device is utilized, for example, the system of FIG. 1. Processing begins at S401B at which the network device receives a data packet during a network session. The network device, having a packet processor, determines that a linked list contains a plurality of attributes corresponding to a plurality of forwarding addresses and network values for a forwarding operation. Processing continues at S402B.

At S402B, the packet processor processes a line of memory corresponding to a first element of the linked list containing the attributes. The packet processor determines values from the attributes stored at the line of the memory, and processing continues at S403B.

At S403B, the packet processor stores the processed attributes of the current element of memory in a cache. Processing continues at S404B.

At S404B, the packet processor determines that the current element of memory points to a next line of memory. The packet processor reads an element of the linked list at the next line of memory. Processing continues at S405B.

At S405B, the packet processor reads the pointed-to line which also contains a set of attributes corresponding to additional values. The packet processor determines if the current element contains a difference indicated by a flag as a difference indicator or difference flag. If the difference flag of the current element indicates no difference processing continues at S407B. If the difference flag of the current element indicates a difference then processing continues at S406B.

At S406B, the packet processor processes only the attributes that are indicated as different from the attributes stored in the cache 130. It is noted that a difference indicated at some position of a current element also indicates a difference at a corresponding position of the cache 130. The packet processor then updates the corresponding attributes stored in the cache 130 as a result of the indicated difference. Processing continues at S407B.

At S407B, the packet processor reads the values, or attributes, stored in the cache and outputs a forwarding address or a plurality of forwarding addresses by which to forward the data packet. Processing continues at S404B to determine additional forwarding addresses for the forwarding operation.

The use of a cache in conjunction with a packet processor is shown in FIG. 5.

FIG. 5 shows a system S000 including a network device 110 and an expanded view 121 of the linked list 120 and an expanded view 131 of the cache 130 according to an example embodiment. The expanded view 131 of the cache 130 shows a status of values, or attributes, stored by the cache at different times, time $t_0$ 130-0, time $t_1$ 130-1, and time $t_2$ 130-2. Although the values shown as stored by the cache 130 in FIG. 5 are numerical values, this is merely an example embodiment, and the values stored by the cache 130 include a target port, a target MAC address, a priority, a VLAN, etc.

As indicated by the expanded view 121, the first element 120-0 of the linked list 120 includes attribute$_1$ 120-0A to attribute$_N$ 120-0D and these attributes and values correspond to those stored by the table of cache 130 at time $t_0$ 130-0.

According to an example embodiment, the attribute 120-0A has a value 4, attribute 120-0B has a value 7, and attribute 120-0D has a value 9.

The element 120-1 includes a difference indicator 120-1G and corresponding difference type indicator 120-1H and difference value 120-1L. Likewise, the table of cache 130 at time $t_1$ illustrates that attribute$_2$ has been changed to a value of 4. Accordingly, the processor core 111, a packet processor, is configured to obtain a forwarding address by reading the values from the cache 130 without the necessity of reading the remaining attributes 120-1J of element 120-1. Because the processing core 111 does not necessarily read all of the attributes for every entry in the linked list, but instead mostly processes attributes of entries that are different respective of previous entries, the demand on use of processing resources is potentially reduced in an embodiment.

The element 120-2 includes difference indicator 120-2G, null indicator linked list 120-2H, and next pointer 120-2F. The difference indicator 120-2G indicates that there is no difference between the attributes of element 120-2 and element 120-1. Accordingly, the table of cache 130 at time $t_1$ 130-1 is identical to the table stored at time $t_2$ 130-2.

Figure 6:
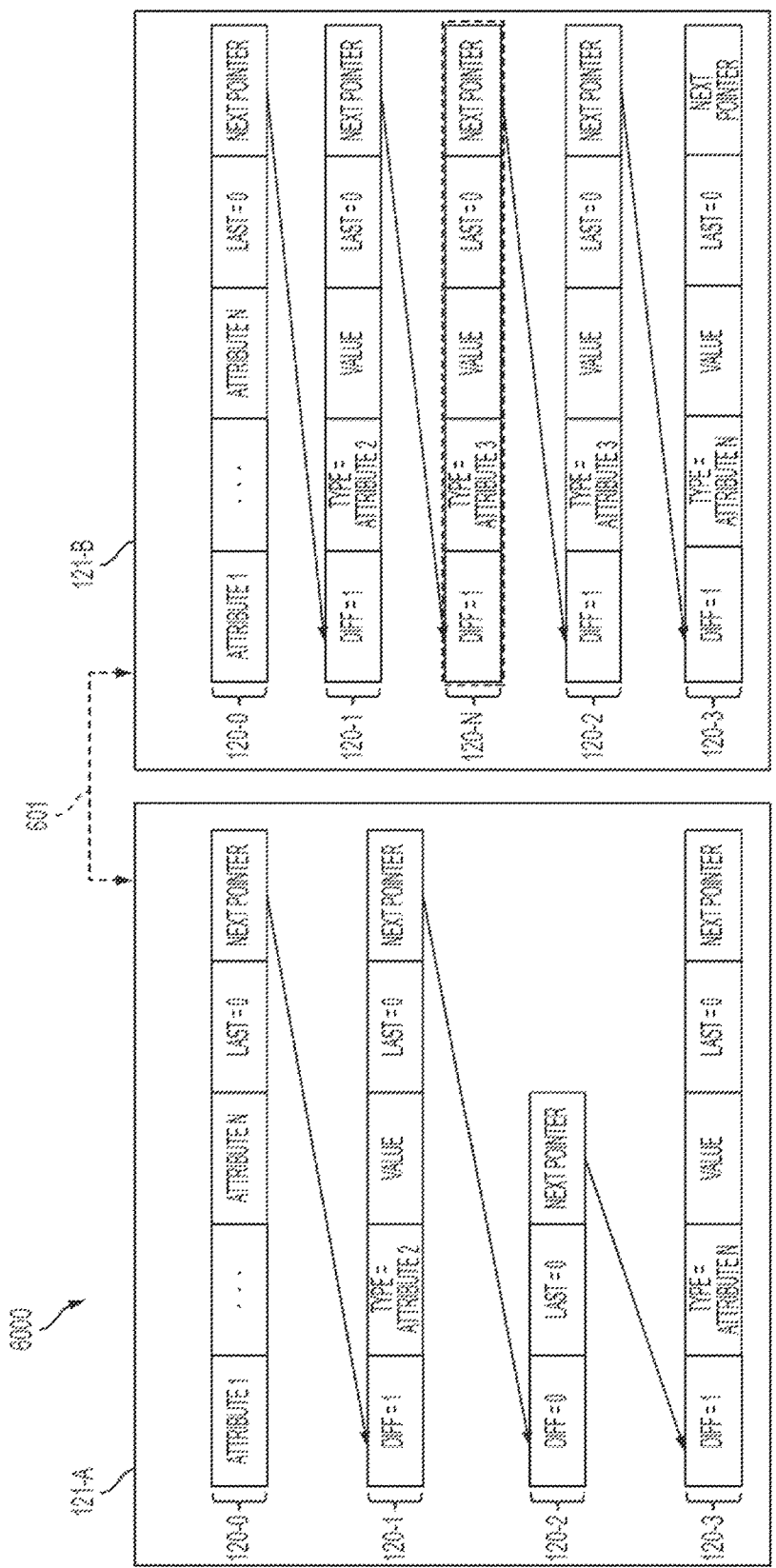
FIG. 6 shows a delta encoded linked list and a new element inserted into the delta encoded linked list according to example embodiments.

Insertion of a new element into a delta encoded linked list is shown in FIG. 6, according to an example embodiment.

FIG. 6 shows a comparison 6000 between a delta-encoded linked list 121-A and a delta-encoded linked list 121-B with an inserted element 120-N.

The linked list 121-A includes element 120-0, element 120-1, element 120-2, and element 120-3. Each element occupies a respective line of a memory.

The linked list 121-B includes an inserted element 120-N, causing differences between the elements of linked list 121-A and the elements of linked list 121-B as indicated by connector 601.

The inserted element 120-N does not affect any of the attributes or difference indicators of element 120-0 and element 120-1. The next pointer of element 120-1 is updated to indicate that element 120-1 no longer points to element 120-2, as in 121-A, but now points to element 120-N.

Additionally, a delta encoder and packet processor (not shown in FIG. 6) are used to determine a difference indicator to be stored at element linked list 120-N as a difference between the attributes of element linked list 120-1 and linked list 120-N.

Comparing linked list 121-A with that of 121-B, the linked list 121-B includes a value field of element 120-N which is different than a value at a corresponding position of element 120-1. The element linked list 120-2 of linked list 121-B includes a difference indicator in contrast with the difference indicator of the same element of linked list 121-A; however, the attributes of the element 120-2 in each of linked list 121-A and linked list 121-B represent the same values of at least one destination address.

The delta encoder and packet processor update a difference indicator to be stored at element linked list 120-2 as a difference between the attributes of element linked list 120-N and linked list 120-2. As shown in linked list 121-A, the difference indicator of element 120-2 indicates that there is no difference between element 120-1 and element 120-2. As shown in linked list 121-B, because at least one attribute, attribute 3, of element 120-N is different than a corresponding attribute of element 120-1, the difference indicator of element 120-2 is updated to represent a difference such that the at least one corresponding attribute, attribute 3, of element 120-2 is different than attribute 3 of element 120-N.

Figure 7:
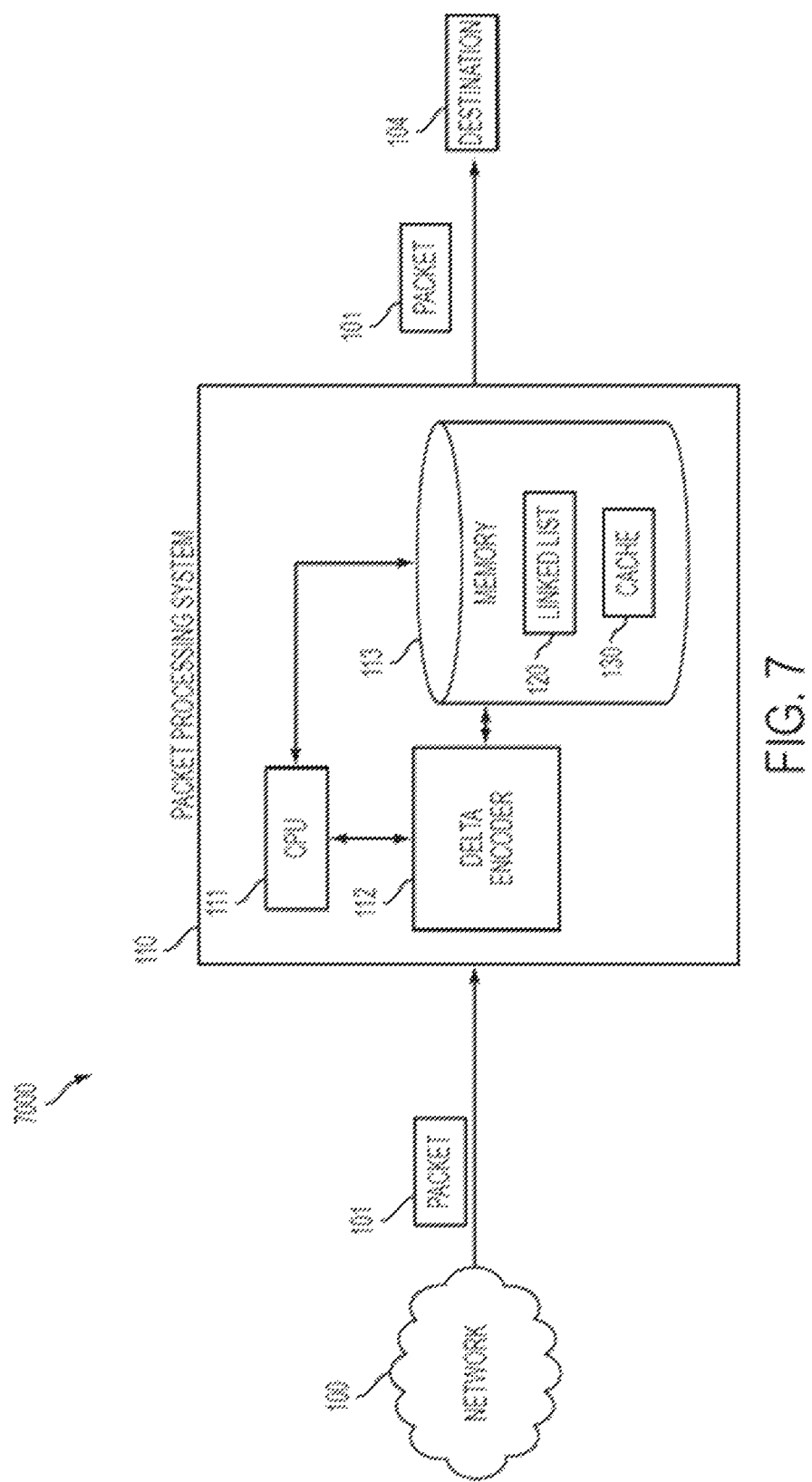
FIG. 7 shows a network device unicasting a packet from a network to a destination according to example embodiments.

Unicasting a packet by a packet processing system is now discussed with reference to FIG. 7. FIG. 7 shows a system 7000 including network 100, a packet 101, and destination 104. The destination is a forwarding location to which a packet 101, received from network 100, is forwarded or unicasted by the network device 110.

The network device 110, in the example seen, a packet processing system, includes at least one processor core 111 (denoted "CPU"), configured as at least a packet processor, a delta encoder 112, and a memory 113. The memory 113 includes a linked list 120 and a cache 130.

The delta encoder/decoder 112 is configured to delta encode the linked list 120 of the memory 113 which stores a plurality of forwarding address and network values, including an address to the destination 104, as elements of the linked list 120. According to an example embodiment, the packet 101 is forwarded to destination 104. Although FIG. 1 illustrates that the packet 101 is forwarded to a single destination, the memory 113 is configured to store a routing table in the linked list 120 by which any number of destinations are addressed through a packet multicasting operation.

Although the inventive concept has been described above with respect to the various example embodiments, it is noted that there can be a variety of permutations and modifications of the described features by those who are familiar with this field, without departing from the technical ideas and scope of the features, which shall be defined by the appended claims.

Further, while this specification contains many features, the features should not all be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, one should not interpret that such specific order and/or arrangements are limited, or that all the operations performed and the components disclosed are needed to obtain a desired result. Accordingly, other implementations are within the scope of the following claims.

What is claimed is:

1. A method of operating a network device, comprising:
   receiving, at the network device, a data packet to be forwarded to a multi-cast group of destination addresses;
   responsive to receiving the data packet, reading, by a processor core of the network device, a first element of a linked list of addresses defining the multi-cast group of destination addresses, the first element containing:
      a plurality of fields comprising attributes of a first destination address in the multi-cast group of destination addresses to which to forward the data packet, and
      a pointer to a second element of the linked list;
   reading, by the processor core, from a memory, the second element of the linked list, the second element including one or more difference indicators indicating differences between the attributes of a field at respective positions of the first element and attributes of a field at corresponding positions of the second element;
   determining, by the processor core, a second destination address in the multi-cast group for forwarding the data packet, the second destination address for forwarding the data packet being determined based on a combination of attributes from the first element and the difference indicators read from the second element; and
   multicasting, by the processor core, the data packet to a plurality of destinations in the multi-cast group.

2. The method of claim 1, further comprising:
   storing, by the processor core, the attributes of the first element in a cache;
   determining, by the processor core, at least part of the second destination address by reading the attributes stored in the cache and the difference indicators indicating differences relative to the stored attributes of the first element; and updating, by the processor core, the attributes stored in the cache to represent the attributes of the second element.

3. The method of claim 1, further comprising respectively determining each destination of the plurality of destinations based on attributes of a previous element stored in cache and the difference indicator in a current element.

4. The method of claim 1, further comprising:
inserting, by a CPU, a new element of the linked list in between the first element and the second element, the new element containing attributes representing a new destination address as part of the multi-cast group;
updating, by the processor core, a pointer of the first element of the linked list to point to the new element,
generating, by the processor core, a new difference indicator at the new element, the new difference indicator indicating a difference between the attributes of the field of the first element and the attributes of a corresponding field of the new element; and
updating, by the processor core, the difference indicator at the second element to indicate a difference between the attributes of the field of the new element and the attributes of the corresponding field of the second element.

5. A method of operating a packet processor, comprising:
storing, by a network device having the packet processor, a linked list of network addresses in a memory, each element of the linked list occupying a line of the memory and comprising ones of a plurality of attributes at ones of a plurality of fields, each element corresponding to respective destination addresses of a multicast forwarding operation of a data packet, and each element of the linked list comprising one of a plurality of pointers;
determining, by a delta encoder of the packet processor, a difference between the attributes of a field of a current element, pointed to by a previous pointer of a previous element, of the linked list and the attributes of a corresponding field of a previous element of the linked list, the attributes of the previous element indicating a destination address for forwarding the data packet in a multi-cast forwarding operation; and
generating a multi-cast address for forwarding the data packet by replacing, using the delta encoder, attributes of the field of the current element of the linked list in using attributes of a difference indicator, the difference indicator being stored in place of storing full attributes of the current element, the difference indicator further indicating attributes of a field of the current element that are different from attributes of the corresponding field of the previous element without indicating attributes of the field of the current element that are the same as the attributes of the corresponding field of the previous element; and
forwarding the data packet at least to the multi-cast addresses.

6. The method of claim 5, further comprising:
inserting, by a CPU, a new element between the previous element and the current element, the new element comprising a plurality of attributes corresponding to a new destination address as part of the multi-cast forwarding operation;
updating, by the CPU, a pointer of the previous element of the linked list to point to the new element,
generating, by the delta encoder, a new difference indicator at the new element, the new difference indicator indicating attributes of the field of the new element that are different from attributes of the corresponding field of the previous element; and
defining a multicast address corresponding to the new element based on the difference indicator in conjunction with attributes from the new element that are the same as in the previous element, the multicast address being larger than the new difference indicator.

7. A network device, comprising:
a memory configured to store a plurality of elements of a linked list of addresses of a multi-cast group of destination addresses, the elements subsequent to a first element of the linked list having difference indicators, stored in place of as attributes of respective elements and separately from pointers of the respective elements, and indicating a differences between attributes of a field at respective positions of a current element, pointed to by a preceding pointer of a preceding element, and attributes of a field at corresponding positions of the preceding element; and
a packet processor configured to
respond to receiving a data packet by accessing the linked list, to determine the destination addresses of the multi-cast group for forwarding the data packet, and to determine one of the destination addresses based on a combination of attributes from the first element and difference indicators read from a second element of the linked list, and
multicast the data packet to the destination addresses of the multi-cast group.

8. The network device claim 7, wherein the packet processor is further configured to:
store attributes of the first element in a cache,
determine at least part of the one of the destination addresses by modifying the attributes stored in the cache and the difference indicators indicating differences relative to the stored attributes of the first element, and
update the attributes stored in the cache to the attributes of the second element.

9. The network device of claim 7, wherein the packet processor is further configured to
respectively determine each destination address of the multi-cast group based on attributes of a previous element stored in cache and the difference indicator in a current element.

10. The network device of claim 7, wherein a CPU is further configured:
to insert a new element in between the first element and the second element, the new element containing attributes representing a new destination address for forwarding the data packet as part of the multi-cast group,
to update a pointer of the first element of the linked list to point to the new element; and
the network device further comprising a delta encoder configured to:
to generate a new difference indicator at the new element, the new difference indicator indicating a difference between the attributes of the field of the first element and the attributes of a corresponding field of the new element, and
to update the difference indicator at the second element to indicate a difference between the attributes of the field of the new element and the attributes of the corresponding field of the second element.

* * * * *